(12) United States Patent
Kang et al.

(10) Patent No.: US 12,147,936 B1
(45) Date of Patent: Nov. 19, 2024

(54) ENHANCED SYSTEMS AND METHODS FOR PREVENTING LOST ORDERS BY USING DYNAMIC SHIPPING OPTIONS

(71) Applicant: Amazon Technologies, Inc., Seattle, WA (US)

(72) Inventors: Min Kyoung Kang, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/949,835

(22) Filed: Sep. 21, 2022

(51) Int. Cl.
*G06Q 10/0834* (2023.01)
*G06Q 30/0207* (2023.01)
*G06Q 30/0601* (2023.01)

(52) U.S. Cl.
CPC ... *G06Q 10/08345* (2013.01); *G06Q 30/0222* (2013.01); *G06Q 30/0635* (2013.01)

(58) Field of Classification Search
CPC ......... G06Q 10/08345; G06Q 30/0222; G06Q 30/0635
USPC ....................................................... 705/410
See application file for complete search history.

(56) References Cited

U.S. PATENT DOCUMENTS

2012/0317472 A1* 12/2012 Chernysh .............. G06F 40/131
715/234
2019/0095862 A1* 3/2019 Kilzer .................. G05D 1/0088
2023/0088497 A1* 3/2023 Okuma .................... G07G 5/00
705/14.23

OTHER PUBLICATIONS

"Online shopping Customer Experience Study" Published by ComScore, Inc (Year: 2012).*

* cited by examiner

*Primary Examiner* — Zeina Elchanti
(74) *Attorney, Agent, or Firm* — Eversheds Sutherland (US) LLP

(57) ABSTRACT

Devices, systems, and methods are provided for using dynamic shipping options. A method may include receiving a request to add a first product to a virtual shopping cart of a first user; determining a first delivery fee for a first order comprising the first product; generating user interface data indicative of the first delivery fee and with which the first user may input a first offered delivery fee; presenting the user interface data; receiving a first user input indicative of the first offered delivery fee offered by the first user; determining that a coincident delivery fee discount based on the first order and a second order is less than a delivery fee threshold including delivery fee discounts of the first offered delivery fee and of a second offered delivery fee of the second order; initiating a first purchase of the first product a second purchase of the second product.

20 Claims, 6 Drawing Sheets

ENHANCED SYSTEMS AND METHODS FOR PREVENTING LOST ORDERS BY USING DYNAMIC SHIPPING OPTIONS

BACKGROUND

Customers of online retail systems may receive free shipping on purchased items when the price of the purchased items exceeds a threshold price. When customers of online retail systems are presented with shipping fees during an online session, the customers sometimes abandon their digital shopping carts and therefore do not complete the purchase.

Figure 1:
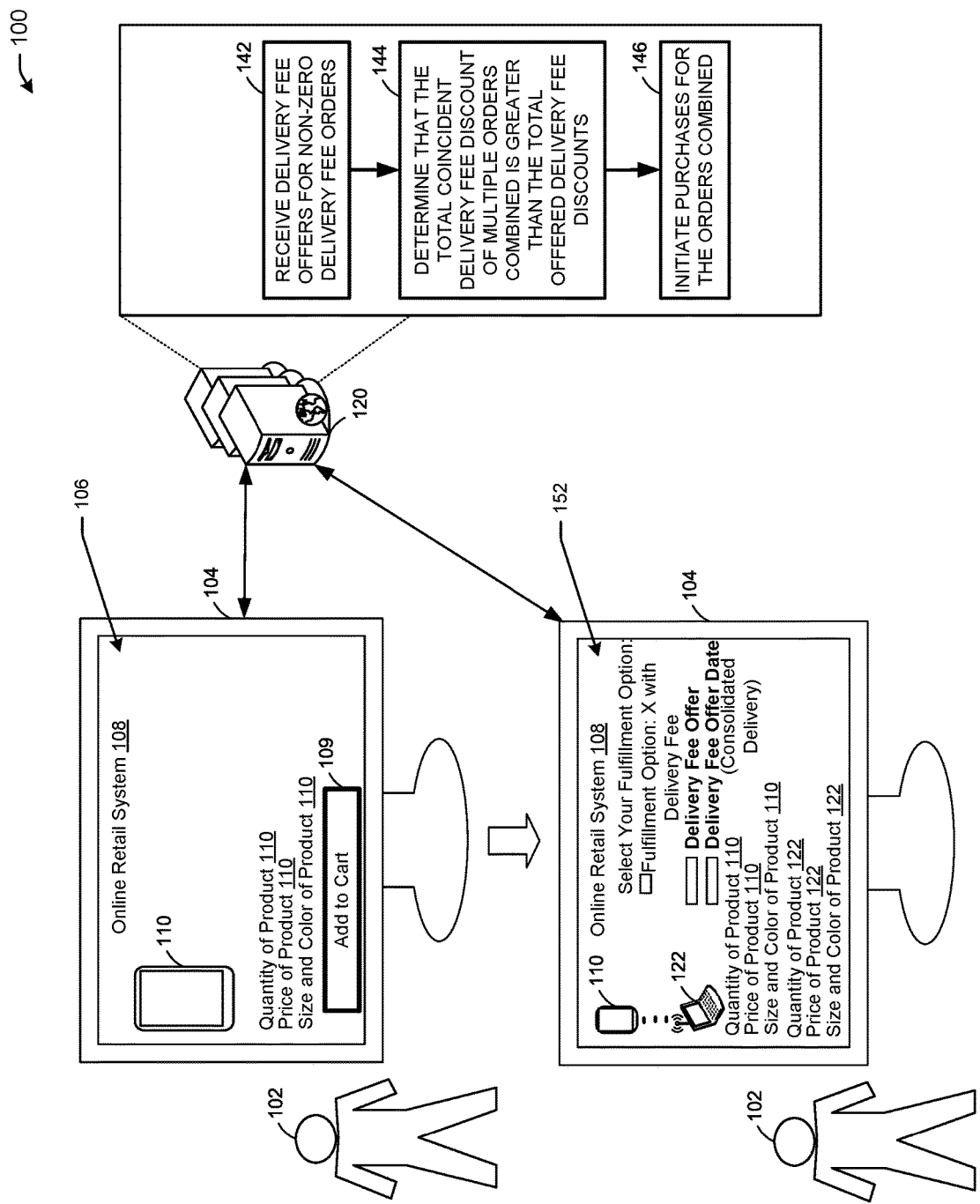
FIG. 1 illustrates an example process for using dynamic shipping options, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for generating free shipping thresholds.

When a person uses an online retail system to purchase products, they may add the products to a virtual shopping cart, and may select fulfillment options (e.g., delivery and/or pick-up) for the products in the virtual shopping cart. Sometimes, the customers may receive free shipping, such as when the customers are subscribers and/or when the purchase price of one or more products in the virtual shopping cart exceed a threshold price. When a customer proceeds to a product checkout for purchasing products in the virtual shopping cart, the customer may abandon the virtual shopping cart and fail to purchase the products when the customer is presented with delivery fees for their purchase. For example, a customer may need to spend $35 (or some other amount) in their purchase to receive free shipping. When a customer abandons their virtual shopping cart and does not make a purchase due to shipping fees, this is referred to as a lost order.

There is therefore a need to prevent lost orders caused by shipping fees.

In one or more embodiments, an online retail system may prevent lost orders due to shipping fees by allowing users to reserve their orders until delivery fees may be discounted to an amount that the users are willing to spend. In some current techniques, a flat fee may be charged to users based on delivery speed when a user's order does not exceed a free shipping threshold. However, when multiple orders are placed from a nearby destination (e.g., within a threshold distance), delivery costs of nearby orders can be discounted by consolidating delivery with optimized last-mile planning. Some delivery carriers provide discounts for delivering to addresses that are in proximity of one another. The discount from nearby order delivery can be estimated from a table that provides carrier preference and discount information. A tool of the online retail system may be introduced to return such discounts to users by dynamically adjusting delivery fees in real-time (e.g., during a user session), accounting for reserved orders and promoting sustainability (e.g., using consolidated delivery options).

In one or more embodiments, the tool of the online retail system may enable online retail system users to input the maximum shipping fee that they are willing to pay (e.g., at an order checkout page), and reserve an order. The reserved limit order may be automatically executed when there are enough nearby orders that are eligible for delivery consolidation to offset the cost from the proposed shipping discounts by users. The reserved limit order may be automatically executed when the dynamically adjusted shipping fee discounts (e.g., adjusted by discounts from delivery consolidation) become greater than or equal to the delivery fee threshold set by the users. The reserved orders may be evaluated daily to accurately reflect up-to-date discounts and scheduled orders for execution. In particular, when the sum of the discounted delivery fees from combined reserved limit orders is greater than or equal to the sum of the discounts of the proposed shipping fees offered by the users, then the combined orders may be executed using the proposed shipping fees offered by the users.

In one or more embodiments, dynamically evaluating the cost savings attributed from nearby delivery consolidations and distributing such savings to users will encourage smaller size orders from broad customer groups, and higher order volumes may facilitate the consolidation in last-mile delivery. A result may be positive feedback loops of encouraging users to place more orders that can be consolidated in delivery while maintaining positive environmental impact.

In one or more embodiments, the online retail system may explain the functionality and benefits of the tool for dynamic free shipping thresholds in the checkout page (or other page of the online retail system) to inform users of the opportunities for environmental savings.

In one or more embodiments, when a user of the online retail system proceeds to a checkout page to purchase one or more products in a virtual shopping cart, and when the online retail system determines that the shipping fee for the one or more products is greater than zero, the online retail system may generate and present, via a user interface for the checkout page, portions of the user interface where the user may input their delivery fee threshold (e.g., an amount that the user is willing to pay for shipping) and a "good until"

date (e.g., how long the user is willing to wait for the delivery at their input delivery fee threshold). By inputting the delivery fee threshold and good until date, the user may reserve an order for their one or more products in the virtual shopping cart. The tool may have access to the table, and may automatically execute the purchase using the user's input delivery fee threshold when the table indicates that there are enough nearby orders eligible for delivery consolidation to offset the shipping discount represented by the users of those orders (e.g., the sum of the discounts proposed by the users in the consolidated orders should be exceeded by the delivery consolidation discounts so that the delivery consolidation discounts cover the reduced shipping fees from the user offers). Table 1 below shows an example of the table with orders from different delivery groups, and Table 2 below shows the organized delivery fees for reserved orders (e.g., reserved limit orders) in which users input their delivery fee thresholds.

TABLE 1

Delivery Fees and Delivery Groups for Existing Product Orders:

| A<br>Order | B<br>Delivery<br>Group | C<br>Regular<br>Shipping Cost | D<br>Coincident<br>Shipping Cost |
|---|---|---|---|
| A | Group 1 | $4 | $1.75 |
| B | Group 1 | $3 | $2 |
| C | Group 1 | $3.50 | $1.50 |
| D | Group 2 | $4.50 | $2 |
| E | Group 2 | $3 | $1.75 |

TABLE 2

Organized Delivery Fees for Reserved Limit Orders

| A<br>Order | B<br>Regular<br>Shipping Cost | C<br>Coincident<br>Shipping Cost | D<br>Custom Delivery<br>Fee Threshold<br>(Input by Users) |
|---|---|---|---|
| F | $5 | $3 | $2 |
| G | $6 | $2.50 | $2 |
| H | $7 | $1.50 | $2 |

Table 1 may be updated periodically (e.g., daily) to reflect newly received orders and scheduled deliveries for the orders. Column C of Table 2 may be updated periodically (e.g., daily) based on orders placed from Table 1. When the coincident shipping cost of orders in Table 2 (e.g., consolidated deliveries) is below the custom delivery fee threshold, the online retail system may execute purchases for the orders using the custom delivery fee thresholds. The order consolidation may include subscriber and/or non-subscriber orders. In one or more embodiments, the user interface may present delivery options, including the change in delivery prices if different delivery dates were selected, providing users information to help with their input of delivery fee threshold and good until date.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for using dynamic shipping options, in accordance with one or more example embodiments of the present disclosure.

Referring to FIG. 1, the process 100 may include a user 102 of a device 104 accessing a product page 106 an online retail system 108 (e.g., with which the user 102 may search for and purchase products). The online retail system 108 may display multiple pages, such as product information pages, search pages, virtual shopping cart/purchase pages, and the like. The pages may display information, such as products, product identifiers, product prices, fulfillment options (e.g., pick-up and/or delivery dates, time windows, and prices), quantity of a product to purchase, and/or other product information, such as product dimensions (e.g., size), product colors, product designs, product variations, product reviews, product sellers, product brands, and the like. Any product page, such as the product page 106, may have a selectable option 109 to add a product (e.g., product 110) to a virtual shopping cart (e.g., from which the user 102 may purchase one or multiple products).

Still referring to FIG. 1, a remote system 120 (e.g., a server-based system functioning as a backend of the online retail system 108) may generate presentation data to present at the frontend (e.g., using the device 104) of the online retail system 108. The presentation data may indicate the products in the user's virtual shopping cart (e.g., based on one or more selections of products to add to the cart, such as selection of the selectable option 109). The presentation data may indicate product details, such as quantity, size, variation, and the like. The presentation data may indicate fulfillment options available to the user 102 for pick-up and/or delivery of any products in the virtual shopping cart. To generate the presentation data, the remote system 120 may receive, at step 142, delivery fee offers for non-zero delivery fee orders. For example, users such as the user 102 may be provided with non-zero delivery fee delivery options for their orders (e.g., based on criteria such as a user not being a subscriber of the online retail system 108 and/or the combined cost of the products in a user's virtual shopping cart being below a free delivery fee threshold amount).

Still referring to FIG. 1, the remote system 120 may detect the criteria triggering a non-zero delivery fee option and may present available fulfillment options and their non-zero delivery fees (e.g., first user interface data). The remote system 120 also, based on the non-zero delivery fee options, may provide an alternative customized delivery fee option. In particular, at step 144, the remote system may determine that the total discounted delivery fees from consolidated delivery of multiple orders combined (e.g., a first order of the user 102 combined with one or more orders of other users) is greater than or equal to a sum of the discounted delivery fees offered by users of the combined orders (e.g., an offered delivery fee threshold). The total coincident delivery fee discount may be a sum of the coincident delivery fee discounts (e.g., in which each order's coincident delivery fee discount is the difference between the regular non-consolidated delivery fee for the order and the coincident delivery fee for the order when the order is combined with another order) of the combined orders within a geographic area, and the offered delivery fee threshold may be a sum of the delivery fee discounts of the offered delivery fees from the users who are presented with non-zero delivery fee options (e.g., each offered delivery fee may be less than the normal delivery fee, and the difference represents a discount). At step 146, based on determining a group of consolidated orders having delivery fee discounts greater than or equal to the offered delivery fee discounts, the remote system 120 may initiate purchases of the orders using their respective offered delivery fees. In this manner, even when a given order's offered delivery fee is less than the coincident delivery fee for that order, the offered delivery fee may be used for the purchase because any loss is offset due to the aggregate coincident delivery fee discount of the consolidated orders being greater than or equal to the offered delivery fee discounts.

In one or more embodiments, the user interface data may be represented as a shopping cart page 152 (e.g., checkout page), showing one or more products (e.g., the product 110 and product 122) that the user has selected for purchase (e.g., added to the shopping cart).

In one or more embodiments, the device 104 and/or the remote system 120 may include a personal computer (PC), a smart home device, a wearable wireless device (e.g., bracelet, watch, glasses, ring, strap/band, patch, bandage, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, a media player, a smartphone, or the like.

Figure 2:
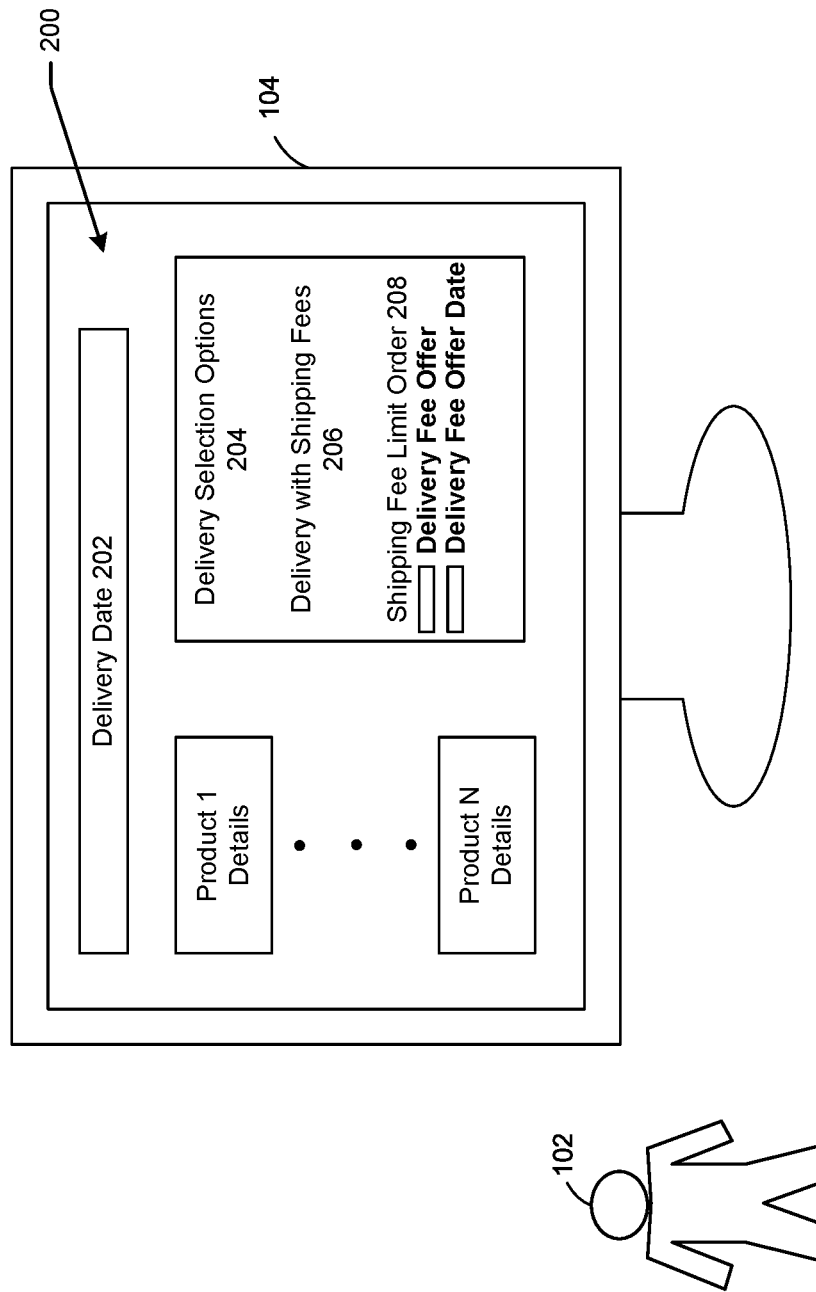
FIG. 2 illustrates an example process for using dynamic shipping options, in accordance with one or more example embodiments of the present disclosure.

FIG. 2 illustrates an example process for using dynamic shipping options, in accordance with one or more example embodiments of the present disclosure.

Referring to FIG. 2, the device 104 of FIG. 1 may present a product checkout page 200 (e.g., generated by the remote system 120 of FIG. 1 based on products 1-N added by the user 102 to a virtual shopping cart). As shown in FIG. 2, the fulfillment options may include one or more fulfillment options having non-zero delivery fees (e.g., fulfillment option X as shown). The product checkout page 200 may include a delivery date 202, product details for products 1-N in the user's shopping cart, and delivery selection options 204. The delivery selection options 204 may include one or more delivery options with shipping fees 206, and a shipping fee limit order 208. Because the user 102 may not qualify for free delivery (e.g., based on the criteria described above with respect to FIG. 1), the product checkout page 200 may include the shipping fee limit order 208 including inputs with which the user 102 may input a delivery fee offer and a delivery fee offer date (e.g., good until date for the offer).

In one or more embodiments, the remote system 120 may enable online retail system users to input the maximum shipping fee that they are willing to pay (e.g., at the product checkout page 200), and reserve an order. The shipping fee limit order 208 may be automatically executed (e.g., by the remote system 120) when there are enough nearby orders that are eligible for delivery consolidation to offset the cost from the proposed shipping discounts by users. The shipping fee limit order 208 may be automatically executed when the dynamically adjusted shipping fee discount (e.g., adjusted by discounts from delivery consolidation) becomes greater than or equal to the shipping fee discounts set by the users (e.g., including the delivery fee offer as shown). The reserved orders may be evaluated daily to accurately reflect up-to-date discounts and scheduled orders for execution.

In one or more embodiments, when the remote system 120 may have access to a table showing product orders in various geographic areas along with their delivery fee offers, coincident delivery fees, and good until dates, and may automatically execute the purchase using the user's input delivery fee threshold when the table indicates that there are enough nearby orders eligible for delivery consolidation to offset the shipping discount represented by the users of those orders (e.g., the sum of the discounts proposed by the users in the consolidated orders should be exceeded by the delivery consolidation discounts so that the delivery consolidation discounts cover the reduced shipping fees from the user offers).

Figure 3:
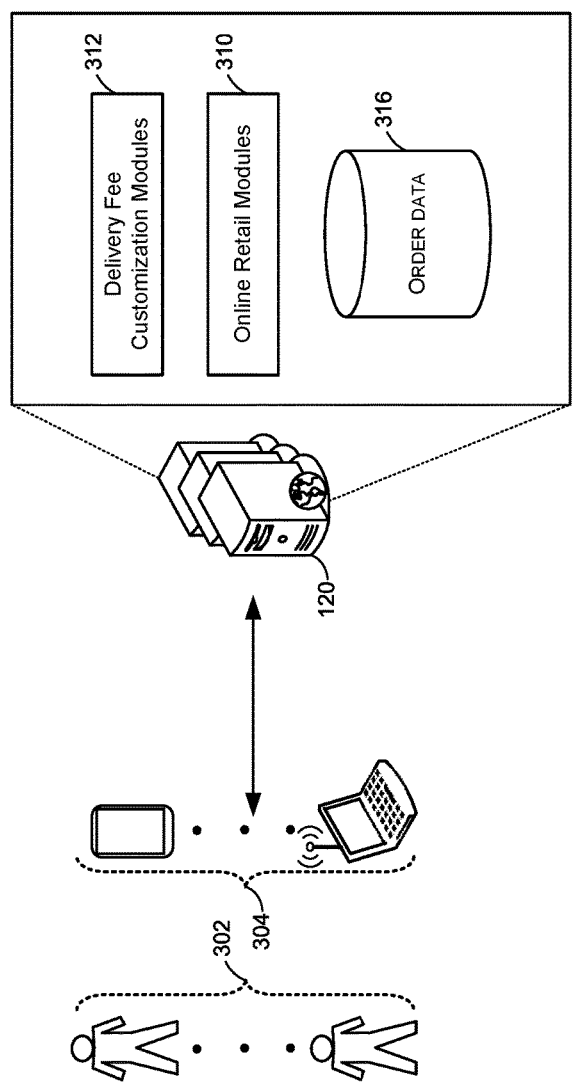
FIG. 3 illustrates an example system for using dynamic shipping options, in accordance with one or more example embodiments of the present disclosure.

FIG. 3 illustrates an example system 300 for using dynamic shipping options, in accordance with one or more example embodiments of the present disclosure.

Referring to FIG. 3, users 302 of devices 304 may access the online retail system 108 provided by the remote system 120 of FIG. 1 to view product pages, search for products, and purchase products. The remote system 120 is shown in more detail, including online retail modules 310 (e.g., to generate and present product and fulfillment data using the pages of the online retail system 108 whose frontend may run on the devices 304 and whose backend may run on the remote system 120), delivery fee modules 312 (e.g., to determine delivery fees and when coincident delivery fees satisfy offered delivery fees for consolidated deliveries), and data storage 316 for order data (e.g., products purchased by certain users, product purchase details, product details, fulfillment options available and selected, offered delivery prices, good until dates, etc.).

In one or more embodiments, the system 300 may prevent lost orders due to shipping fees by allowing the users 302 to reserve their orders until delivery fees may be discounted to an amount that the users 302 are willing to spend. When multiple orders are placed from a nearby destination (e.g., within a threshold distance), delivery costs of nearby orders can be discounted by consolidating delivery with optimized last-mile planning. Some delivery carriers provide discounts for delivering to addresses that are in proximity of one another. The discount from nearby order delivery can be estimated from a table (e.g., Tables 1 and 2 above) in the order data storage 316 that provides carrier preference and discount information. The delivery fee customization modules 312 may return such discounts to the users 302 by dynamically adjusting delivery fees in real-time (e.g., during a user session), accounting for reserved orders and promoting sustainability (e.g., using consolidated delivery options).

In one or more embodiments, the delivery fee customization modules 312 may enable the users 302 to input, using the online retail modules 310, the maximum shipping fee that they are willing to pay (e.g., at an order checkout page), and reserve an order. The reserved limit order may be automatically executed when there are enough nearby orders that are eligible for delivery consolidation to offset the delivery discounts from the proposed shipping discounts by users. The reserved limit order may be automatically executed when the dynamically adjusted shipping discount (e.g., adjusted by discounts from delivery consolidation) becomes greater than or equal to the shipping fee discounts set by the users. The reserved orders may be evaluated daily in the order data storage 316 to accurately reflect up-to-date discounts and scheduled orders for execution.

In one or more embodiments, the online retail modules 310 may generate user interface data to explain the functionality and benefits of using the customized free shipping thresholds based on user offers in the checkout page (or other page of the online retail system) to inform users of the opportunities for environmental savings.

In one or more embodiments, when a user of the online retail modules 310 proceeds to a checkout page to purchase one or more products in a virtual shopping cart, and when the delivery fee customization modules 312 determine that the shipping fee for the one or more products is greater than zero, the online retail modules 310 may generate and present, via a user interface for the checkout page, portions of the user interface where the user may input their delivery fee threshold (e.g., an amount that the user is willing to pay for shipping) and a "good until" date (e.g., how long the user is willing to wait for the delivery at their input delivery fee threshold). By inputting the delivery fee threshold and good until date, the user may reserve an order for their one or more products in the virtual shopping cart. The delivery fee customization modules 312 may have access to the table of orders in the order data storage 316, and may automatically execute the purchase using the user's input delivery fee threshold when the table indicates that there are enough nearby orders eligible for delivery consolidation to offset the shipping discount represented by the users of those orders (e.g., the sum of the discounts proposed by the users in the consolidated orders should be exceeded by the delivery consolidation discounts so that the delivery consolidation discounts cover the reduced shipping fees from the user offers). Table 1 above shows an example of the table with orders from different delivery groups, and Table 2 above shows the organized delivery fees for reserved orders (e.g., reserved limit orders) in which users input their delivery fee thresholds.

The order data in the data storage 316 may be updated periodically (e.g., daily) to reflect newly received orders and scheduled deliveries for the orders. When the coincident shipping cost of orders in Table 2 (e.g., consolidated deliveries) is below the custom delivery fee threshold, the system 300 may execute purchases for the orders using the custom delivery fee thresholds. The order consolidation may include subscriber and/or non-subscriber orders. In one or more embodiments, the user interface may present delivery options, including the change in delivery prices if different delivery dates were selected, providing users information to help with their input of delivery fee threshold and good until date.

Figure 4A:
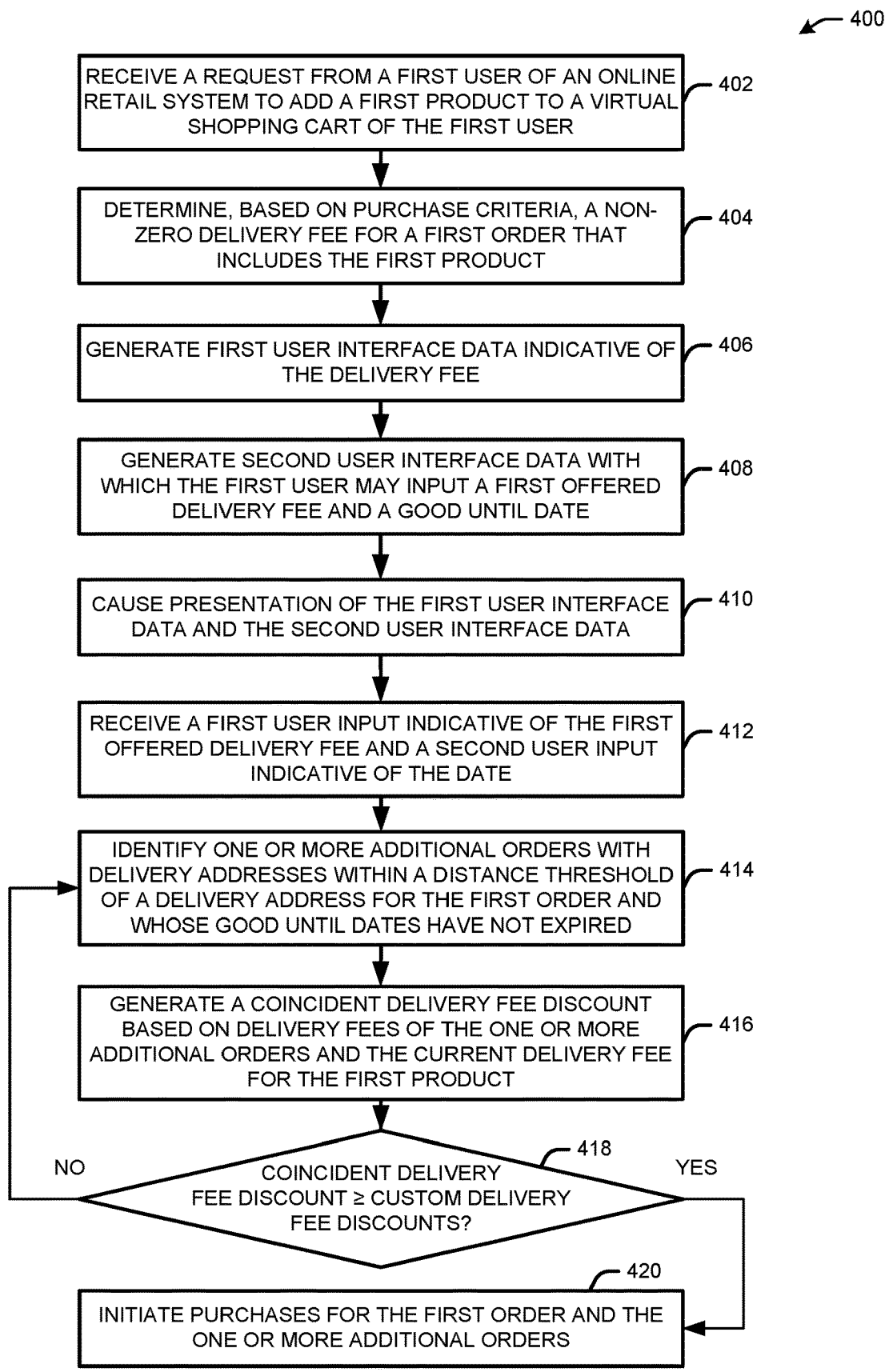
FIG. 4A illustrates a flow diagram for a process for using dynamic shipping options, in accordance with one or more example embodiments of the present disclosure.

FIG. 4A illustrates a flow diagram for a process 400 for using dynamic shipping options, in accordance with one or more example embodiments of the present disclosure.

At block 402, a device (or system, e.g., the remote system 120 of FIG. 1) may receive a request from a first user (e.g., the user 102 of FIG. 1, one of the users 302 of FIG. 3) of an online retail system to add a first product to a virtual shopping cart (e.g., as shown in FIG. 1). The first user may add one or multiple products to the virtual shopping cart for checkout. Based on the one or more products in the first user's virtual shopping cart, the online retail system may determine fulfillment options (e.g., delivery and/or pick up for the one or more products).

At block 404, the device may determine, based on purchase criteria (e.g., whether the first user is a paid premium subscriber to the system, whether the combined price of the one or more products in the first user's virtual shopping cart exceeds a minimum threshold price to result in free delivery, whether the first user has a promotion for free delivery, etc.), that a non-zero delivery fee fulfillment option is available to the first user for the first product and/or other products in the first user's virtual shopping cart. For example, the device may determine that no free shipping (e.g., zero delivery fee) options are available to the first user based on the purchase criteria. The device may determine the difference between the aggregate price of the products in the first user's virtual shopping cart and the minimum threshold price to result in free delivery so that the first user may be presented with an indication of how much more to spend to achieve free delivery.

At block 406, the device may generate first user interface data indicative of the non-zero delivery fee so that the first user may be presented with the delivery fee. At block 408, the device may generate second user data with which the first user may input a first offered delivery fee and a good until date (e.g., see FIGS. 1 and 2). The second interface data may indicate that the first user may reserve their order for the products in the virtual shopping cart until the good until date expires, allowing the first user to offer a delivery fee amount that is less than the lowest non-zero delivery fee (e.g., indicated by the first user interface data) as part of a consolidated delivery with other orders from other users. The second user interface data also may present an indication of how the delivery fee may change if the first user were to select different good until dates (e.g., the delivery fee may decrease if the first user were willing to wait longer and input a later good until date). At block 410, the device may cause presentation of the first and second user interface data on the frontend (e.g., as shown in FIGS. 1 and 2), allowing the first user to make an offer for a customized delivery fee.

At block 412, the device may receive a first user input from the first user indicative of the offered delivery fee and a second user input from the first user indicative of the good until date. The first and second inputs may be received on the backend from the first user as inputs on the frontend of the online retail system. When the first user selects a fulfillment offer with a non-zero delivery fee, the device may execute the purchase using that fulfillment option. However, when the user provides the first and second inputs as an offer for a reserved purchase, the system may not execute a purchase of the products in the first user's virtual shopping cart until the offered delivery prices can be matched by available delivery services.

At block 414, the device may identify one or more additional orders having delivery addresses in a same geographic area as the first user's reserved order (e.g., within a threshold distance of the delivery address of the first user's reserved order). The one or more additional orders also may have good until dates that have not yet expired, and/or may include non-reserved orders (e.g., orders from premium subscribers) that have not yet been fulfilled.

At block 416, the device may generate a coincident delivery fee discount for the nearby orders including the first user's reserved order and the one or more additional orders within the same geographic area. The coincident fee discount may include a sum of the delivery fee discounts for the products of the first user's reserved order and the products of the one or more additional orders if the products were to be consolidated.

At block 418, the device may determine whether the coincident delivery fee discount for the combined orders in a geographic area are greater than or equal to a custom delivery fee threshold (e.g., the sum of the custom delivery fee discounts) for the products in the combined orders. The custom delivery fee threshold may be a sum of the offered delivery fee discounts of the combined orders (e.g., a respective offered delivery fee discount being the difference between the offered delivery fee and the actual delivery fee). In this manner, the lost delivery fees from the offered delivery fees that are offset by the discounted delivery fees when orders are consolidated. When the coincident delivery fee discount for the combined orders is not greater than or equal the custom delivery fee threshold, the process 400 may repeat from block 414 at a later time, reevaluating the orders that may be combined in a geographic area to determine whether the coincident delivery fee discount for those orders becomes greater than or equal to the custom delivery fee threshold for those orders. Once a reserved order expires because its offered delivery fee cannot be met before expiration of the good until date, the user of that reserved order may be notified, and no purchase may be initiated for that order. ≥

At block 420, when the coincident delivery fee discount is greater than or equal to the custom delivery fee threshold, the device may initiate purchases for the first order and the one or more additional orders combined for the coincident delivery fee. Initiating the purchases may include using the respective delivery fee offers of the orders used in the coincident delivery fee (e.g., even when one order's offered delivery fee is greater than its respective coincident delivery fee on the date that the purchase is initiated, as the aggregate loss of delivery fees for the combined orders is offset by the consolidation of the orders). The device may notify the users of the orders that their offered delivery fees have been accepted, and may provide an estimated delivery date and/or promise date for delivery. The device may facilitate notifications to fulfillment centers and delivery services for the purchases so that product deliveries may occur.

Figure 4B:
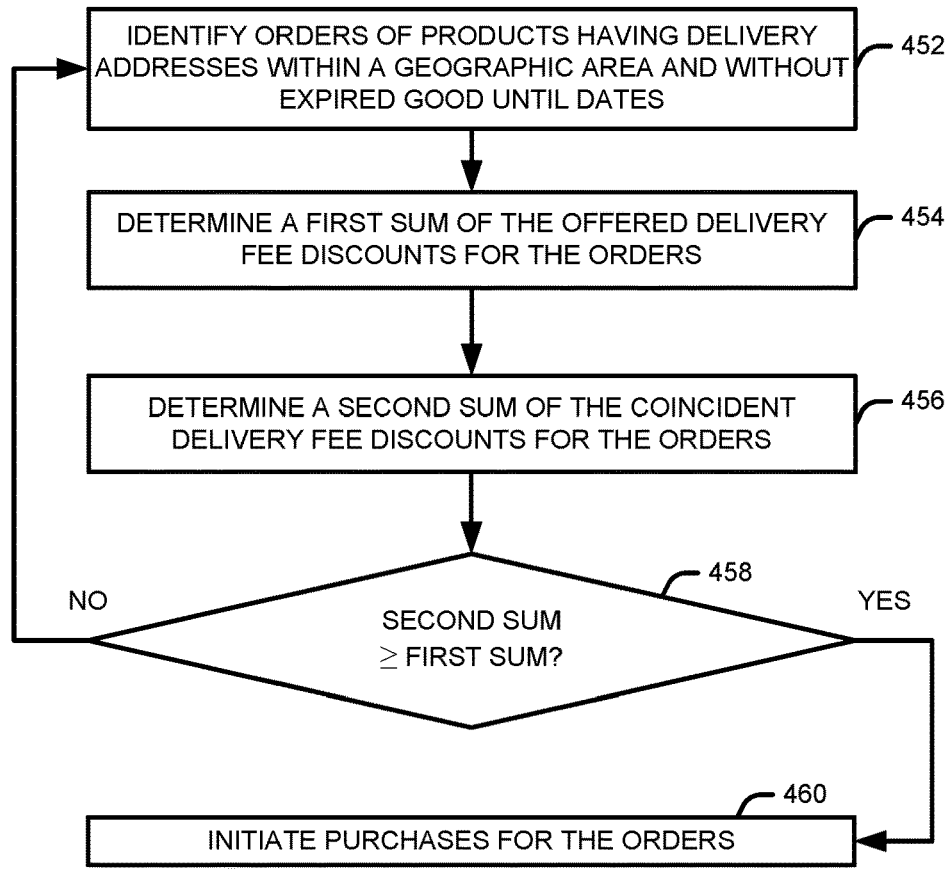
FIG. 4B illustrates a flow diagram for a process for using dynamic shipping options, in accordance with one or more example embodiments of the present disclosure.

FIG. 4B illustrates a flow diagram for a process 450 for using dynamic shipping options, in accordance with one or more example embodiments of the present disclosure. The process 450 provides additional details regarding blocks 414-420 of the process 400 of FIG. 4A.

At block 452, a device (or system, e.g., the remote system 120 of FIG. 1) may identify orders of products having delivery addresses within a geographic area and without expired good until dates. For example, the products may be for different orders placed by different users who provided offered delivery fees that are less than the actual delivery fees for their orders presented to them. The good until dates may represent dates until the users are willing to wait for deliveries of their products using the offered delivery fees. The order data may be stored (e.g., in the order data storage 316 of FIG. 3) and included in a table (e.g., Tables 1 and 2 above) to allow the device to group orders by geographic area and identify a group of orders in a geographic area whose coincident delivery fee from consolidation may be less than their total delivery fee from consolidation. For example, each product or order may have a delivery fee for non-consolidated delivery and a coincident delivery fee for consolidation with another order, and may have an offered delivery fee and good until date for the offered delivery fee.

At block 454, the device may determine a first sum of the offered delivery fee discounts for the orders. An offered delivery fee discount may refer to the difference between a user-offered delivery fee and the actual delivery fee presented to the user. By aggregating the discounts of multiple orders that may be combined for delivery, the first sum may represent the total offered delivery fee discounts for consolidated orders in a geographic area, and may be determined based on the offered delivery fees input by users.

At block 456, the device may determine a second sum of the coincident delivery fee discounts for the orders if they were to be consolidated. A coincident delivery fee discount may refer to the difference in the delivery fee for an order if the order were to be consolidated with other orders for delivery and the non-consolidated delivery cost. When the discounts provided by consolidated delivery are greater than or equal to the discounts of user-offered delivery fees, the discounts of the user-offered delivery fees may be offset by the discounts provided by consolidated delivery. In this manner, users may be able to pay less than the normal delivery cost, and the retailer may be able to afford to provide the reduced delivery cost due to a lower delivery cost of consolidating orders.

At block 458, the device may determine whether the second sum is greater than or equal to the first sum. The second sum being greater than or equal to the first sum may represent when the discounts from the offered delivery fees for the consolidated orders are less than the discounts from the coincident delivery fees for the consolidated orders prior to the good until dates of the consolidated orders. In this scenario, the lost delivery fees from the delivery fees offered by users may be offset by the reduced delivery fees provided by delivery consolidation. When this scenario occurs, the device may initiate purchases for the combined orders using their respective delivery fee offers. When the second sum is less than the first sum and the offered delivery fees from the users may not be satisfied, the device may repeat the process 450 from block 452 at a later time to determine whether order consolidation may delivery fee discounts for the consolidated orders that allows for use of the delivery fees offered by users.

The descriptions herein are not meant to be limiting.

Figure 5:
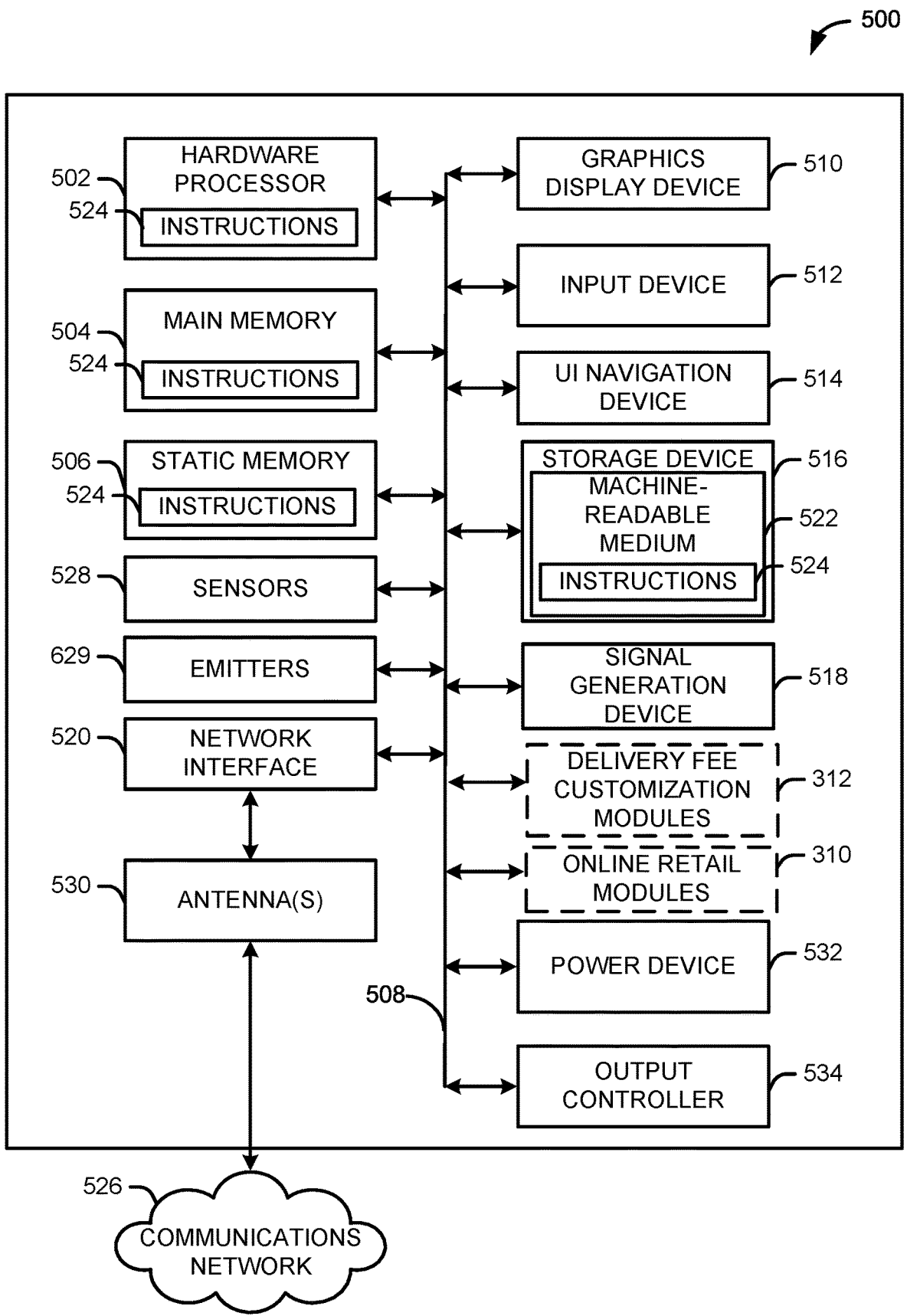
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 (e.g., the device 104 of FIG. 1, the remote system 120 of FIG. 1) or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act in Wi-Fi direct, peer-to-peer (P2P), cellular, (or other distributed) network environments. The machine 500 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518, the online retail modules 310 of FIG. 3 (e.g., when implemented as the backend remote system 120 of FIG. 1) the delivery fee customization modules 312 (e.g., when implemented as the backend remote system 120 of FIG. 1), a network interface device/transceiver 520 coupled to antenna(s) 530, one or more sensors 528, and one or more emitters 529. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device." "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for customized delivery fees, the method comprising:

receiving, by at least one processor of a backend of an online retail system at a first device, from a frontend of the online retail system at a second device, a request at a first time to add a first product to a virtual shopping cart of a first user;

determining, by the at least one processor, that the first user is not a subscriber of the online retail system;

determining, by the at least one processor, that a purchase price for the first product is below a free delivery fee threshold amount;

determining, by the at least one processor, based on the determination that the first user is not a subscriber and based on the determination that the purchase price is below the free delivery fee threshold amount, a first delivery fee for a first order comprising the first product, the first delivery fee greater than zero;

generating, by the at least one processor, first user interface data indicative of the first delivery fee;

generating, by the at least one processor, based on the first delivery fee being greater than zero, second user interface data with which the first user may input a first offered delivery fee and a date until which the first user will accept the first offered delivery fee;

causing concurrent presentation, by the at least one processor, at the frontend, of the first user interface data and the second user interface data at the first time in succession with the request;

receiving, by the at least one processor, from the frontend, a first user input to the second user interface data concurrently presented with the first user interface data and indicative of the first offered delivery fee offered by the first user, the first offered delivery fee less than the first delivery fee;

receiving, by the at least one processor, from the frontend, a second user input indicative of the date;

determining, by the at least one processor, on or before the date, that a coincident delivery fee discount comprising a first delivery fee discount of the first order and a second delivery fee discount of a second order comprising a second product is greater than or equal to a delivery fee threshold comprising a third delivery fee discount of the first offered delivery fee and a fourth delivery fee discount of a second offered delivery fee offered by a second user of the second order;

initiating, by the at least one processor, at the first time in succession with the first user input to the second user interface data concurrently presented with the first user interface data and based on the coincident delivery fee discount being greater than or equal to the delivery fee threshold, a first purchase of the first product using the first offered delivery fee; and initiating, by the at least one processor, at the first time in succession with the first user input to the second user interface data concurrently presented with the first user interface data and based on the coincident delivery fee being less than the delivery fee threshold, a second purchase of the second product using the second offered delivery fee.

2. The method of claim 1, further comprising:
determining that a first delivery address associated with the first order is within a threshold distance to a second delivery address associated with the second order; and
determining the coincident delivery fee discount based on the determination that the first delivery address is within the threshold distance to the second delivery address.

3. The method of claim 1, wherein the coincident delivery fee is a first aggregate coincident delivery fee discount at a second time prior to the date, the method further comprising:
determining, at a second time prior to the first time, a second aggregate coincident delivery fee discount comprising a fifth delivery fee discount of the first order and a sixth delivery fee of the second order;
determining that the second aggregate coincident delivery fee discount is less than the delivery fee threshold; and
refraining, at the second time, from initiating the first purchase and from initiating the second purchase based on the second aggregate coincident delivery fee discount being less than the delivery fee threshold.

4. The method of claim 1, wherein the second user interface data are indicative of the first offered delivery fee and the date being associated with a consolidated delivery which is more environmentally sustainable than a delivery of the first product that is not consolidated with another delivery.

5. A method for customized delivery fees, the method comprising:
receiving, by at least one processor of a backend of an online retail system at a first device, from a frontend of the online retail system at a second device, a request at a first time to add a first product to a virtual shopping cart of a first user;
determining, by the at least one processor, a first delivery fee for a first order comprising the first product, the first delivery fee greater than zero;
generating, by the at least one processor, first user interface data indicative of the first delivery fee;
generating, by the at least one processor, based on the first delivery fee being greater than zero, second user interface data with which the first user may input a first offered delivery fee;
causing presentation, by the at least one processor, at the frontend, of the first user interface data and the second user interface data at the first time in succession with the request;
receiving, by the at least one processor, from the frontend, a first user input to the second user interface data and indicative of the first offered delivery fee offered by the first user, the first offered delivery fee less than the first delivery fee;
determining, by the at least one processor, that a coincident delivery fee discount comprising a first delivery fee discount of the first order and a second delivery fee discount of a second order comprising a second product is greater than or equal to a delivery fee threshold comprising a third delivery fee discount of the first offered delivery fee and a fourth delivery fee discount of a second offered delivery fee offered by a second user of the second order;
initiating, by the at least one processor, at the first time in succession with the first user input to the second user interface data and based on the coincident delivery fee discount being greater than or equal to the delivery fee threshold, a first purchase of the first product using the first offered delivery fee; and
initiating, by the at least one processor, at the first time in succession with the first user input to the second user interface data and based on the coincident delivery fee being less than the delivery fee threshold, a second purchase of the second product using the second offered delivery fee.

6. The method of claim 5, further comprising:
receiving, from the frontend, a second user input of the second user interface data, the second user input comprising a date until which the first user will accept the first offered delivery fee,
wherein determining that the coincident delivery fee discount is greater than or equal to the delivery fee threshold occurs on or before the date.

7. The method of claim 6, wherein initiating the first purchase and initiating the second purchase are based on the coincident delivery fee discount being greater than or equal to the delivery fee threshold on or before the date.

8. The method of claim 7, wherein the date is a first date, wherein the second order is associated with a second date until which the second user will accept the second offered delivery fee, and wherein initiating the first purchase and initiating the second purchase are further based on the coincident delivery fee discount being greater than or equal to the delivery fee threshold on or before the second date.

9. The method of claim 8, wherein a third order comprising a third product is associated with a third date until which a third user will accept a third offered delivery fee, wherein a second coincident delivery fee discount comprising the first delivery fee discount, the second delivery fee discount, and a fifth delivery fee discount for the third order is greater than a second delivery fee threshold comprising the third delivery fee discount, the fourth delivery fee discount, and a sixth delivery fee discount of a third offered delivery fee offered by the third user, the method further comprising:
refraining from initiating a third purchase of the third product using the third offered delivery fee based on the second coincident delivery fee discount being less than the second delivery fee threshold.

10. The method of claim 6, further comprising:
determining, at a second time prior to the first time, a second coincident delivery fee discount comprising a fifth delivery fee discount of the first order and a sixth delivery fee of the second order;
determining that the second coincident delivery fee discount is less than the delivery fee threshold; and
refraining, at the second time, from initiating the first purchase and from initiating the second purchase based on the second coincident delivery fee discount being greater than the delivery fee threshold.

11. The method of claim 6, wherein the second user interface data are indicative of the first offered delivery fee and the date being associated with a consolidated delivery which is more environmentally sustainable than a delivery of the first product that is not consolidated with another delivery.

12. The method of claim 5, further comprising:
determining that a first delivery address associated with the first order is within a threshold distance to a second delivery address associated with the second order; and
determining the coincident delivery fee based on the determination that the first delivery address is within the threshold distance to the second delivery address.

13. The method of claim 5, wherein the first user is not a subscriber to the online retail system, and wherein determining the first delivery fee is based on determining that the first user is not a subscriber.

14. The method of claim 13, wherein the coincident delivery fee further comprises a free delivery fee of a third order of a third user, and wherein the third user is a subscriber to the online retail system.

15. The method of claim 5, further comprising:
receiving, prior to the determination that the coincident delivery fee discount is greater than or equal to the delivery fee threshold, a second request from the first user to cancel the first order,
wherein the second order is received after the request to cancel the first order.

16. A system for customized delivery fees, the system comprising:
a frontend of an online retail system;
a backend of the online retail system; and
memory coupled to at least one processor of a first device associated with the backend, the at least one processor configured to:
receive, from the frontend, a request to add a first product to a virtual shopping cart of a first user at a first time;
determine a first delivery fee for a first order comprising the first product, the first delivery fee greater than zero;
generate first user interface data indicative of the first delivery fee;
generate, based on the first delivery fee being greater than zero, second user interface data with which the first user may input a first offered delivery fee;
cause presentation, at the frontend, of the first user interface data and the second user interface data at the first time in succession with the request;
receive, from the frontend, a first user input to the second user interface data and indicative of the first offered delivery fee offered by the first user, the first offered delivery fee less than the first delivery fee;
determine that a coincident delivery fee discount comprising a first delivery fee discount of the first order and a second delivery fee discount of a second order comprising a second product is less than a delivery fee threshold comprising a third delivery fee discount of the first offered delivery fee and a fourth delivery fee discount of a second offered delivery fee offered by a second user of the second order;
initiate, at the first time in succession with the first user input to the second user interface data and based on the coincident delivery fee discount being greater than or equal to the delivery fee threshold, a first purchase of the first product using the first offered delivery fee; and
initiate, at the first time in succession with the first user input to the second user interface data and based on the coincident delivery fee discount being greater than or equal to the delivery fee threshold, a second purchase of the second product using the second offered delivery fee.

17. The system of claim 16, wherein the at least one processor is further configured to:
receive, from the frontend, a second user input of the second user interface data, the second user input comprising a date until which the first user will accept the first offered delivery fee,
wherein to determine that the coincident delivery fee discount is greater than or equal to the delivery fee threshold occurs on or before the date.

18. The system of claim 17, wherein to initiate the first purchase and to initiate the second purchase are based on the coincident delivery fee discount being greater than or equal to the delivery fee threshold on or before the date.

19. The system of claim 18, wherein the date is a first date, wherein the second order is associated with a second date until which the second user will accept the second offered delivery fee, and wherein to initiate the first purchase and to initiate the second purchase are further based on the coincident delivery fee discount being greater than or equal to the delivery fee threshold on or before the second date.

20. The system of claim 19, wherein a third order comprising a third product is associated with a third date until which a third user will accept a third offered delivery fee, wherein a second coincident delivery fee discount comprising the first delivery fee discount, the second delivery fee discount, and a fifth delivery fee discount for the third order is greater than a second delivery fee threshold comprising the third delivery fee discount, the fourth delivery fee discount, and a sixth delivery fee discount of a third offered delivery fee offered by the third user, and wherein the at least one processor is further configured to:
refrain from initiating a third purchase of the third product using the third offered delivery fee based on the second coincident delivery fee discount being less than the second delivery fee threshold.

* * * * *